US009438962B2

(12) United States Patent
Bailey et al.

(10) Patent No.: US 9,438,962 B2
(45) Date of Patent: Sep. 6, 2016

(54) VIDEO TRANSMITTING OVER A CELLULAR CARRIER

(75) Inventors: Kenneth Stephen Bailey, Newport Beach, CA (US); Christopher Carmichael, Laguna Niguel, CA (US)

(73) Assignee: UBIQUITY, Irvine, CA (US)

( * ) Notice: Subject to any disclaimer, the term of this patent is extended or adjusted under 35 U.S.C. 154(b) by 1634 days.

(21) Appl. No.: 11/854,454

(22) Filed: Sep. 12, 2007

(65) Prior Publication Data

US 2008/0222686 A1    Sep. 11, 2008

Related U.S. Application Data

(60) Provisional application No. 60/844,208, filed on Sep. 12, 2006, provisional application No. 60/891,311, filed on Feb. 23, 2007.

(51) Int. Cl.
| | |
|---|---|
| *H04N 7/18* | (2006.01) |
| *H04N 21/6377* | (2011.01) |
| *H04N 21/63* | (2011.01) |
| *H04N 21/61* | (2011.01) |
| *H04N 21/647* | (2011.01) |
| *H04N 21/658* | (2011.01) |
| *H04N 19/61* | (2014.01) |

(52) U.S. Cl.
CPC .......... *H04N 21/6377* (2013.01); *H04N 19/61* (2014.11); *H04N 21/6131* (2013.01); *H04N 21/632* (2013.01); *H04N 21/64769* (2013.01); *H04N 21/658* (2013.01)

(58) Field of Classification Search
CPC .......... H04N 21/632; H04N 21/6131; H04N 21/6377; H04N 21/64792; H04N 21/658; H04N 21/8146; H04N 19/61
See application file for complete search history.

(56) References Cited

U.S. PATENT DOCUMENTS

| | | | | |
|---|---|---|---|---|
| 5,463,701 A | * | 10/1995 | Kantner, Jr. ........... | H04N 19/94 348/386.1 |
| 7,263,125 B2 | * | 8/2007 | Lainema ................ | H04N 19/61 375/240.04 |
| 2001/0040998 A1 | * | 11/2001 | Roetling .............. | H04N 1/6058 382/162 |
| 2003/0202693 A1 | * | 10/2003 | Nakajima ............... | G06T 7/403 382/170 |
| 2004/0015995 A1 | * | 1/2004 | Shao .................... | H04N 21/632 725/87 |
| 2005/0074028 A1 | * | 4/2005 | Wugofski et al. ............ | 709/219 |
| 2007/0117586 A1 | * | 5/2007 | Billmaier et al. ......... | 455/552.1 |
| 2007/0270139 A1 | * | 11/2007 | Jendbro ................. | H04L 67/04 455/422.1 |

* cited by examiner

*Primary Examiner* — Thomas Dailey
*Assistant Examiner* — Nam Tran

(57) ABSTRACT

A system which correlates across multiple images to find commonalities among the images and compresses according to those commonalities. The commonalities can be across multiple different images which are unrelated. The information is quantized according to the client that will display the images, and then, and luminance in common color areas are encoded as a single encoding. A WAP application may also be downloaded.

11 Claims, 5 Drawing Sheets

Phone to phone image transfers utilizing bluetooth

VIDEO TRANSMITTING OVER A CELLULAR CARRIER

CROSS-REFERENCE TO RELATED APPLICATIONS

This application claims priority to U.S. Provisional Applications 60/844,208, filed Sep. 12, 2006 and 60/891,311, filed Feb. 23, 2007. The disclosure of the prior applications are considered part of (and are incorporated by reference in) the disclosure of this application.

BACKGROUND

Cellular networks operate using different formats. For example, CDMA, TDMA, GSM, IDen, and WiFi may all be available as formats put on by network providers. Wimax is also available in some locations, and promises to deliver high bandwidth wireless data.

Handheld devices such as cellular telephones may be able to receive all of this information. However, since the mobile phone is itself a thin client, its internal processing capability may be limited.

SUMMARY

One aspect of the present invention is to conserve carrier bandwidth, and also to conserve cellular resources, by transferring videos formed frames, each frame made up of an image, and/or still images and/or other information.

An aspect describes compressing information based on all of the network, the platform, the device being accessed, pixels per frame in the images or video being sent, and other information.

The information can be sent from various different hardware devices including a mobile media player such as an iPod™, some other kind of PDA, or other.

DETAILED DESCRIPTION

Figure 1:
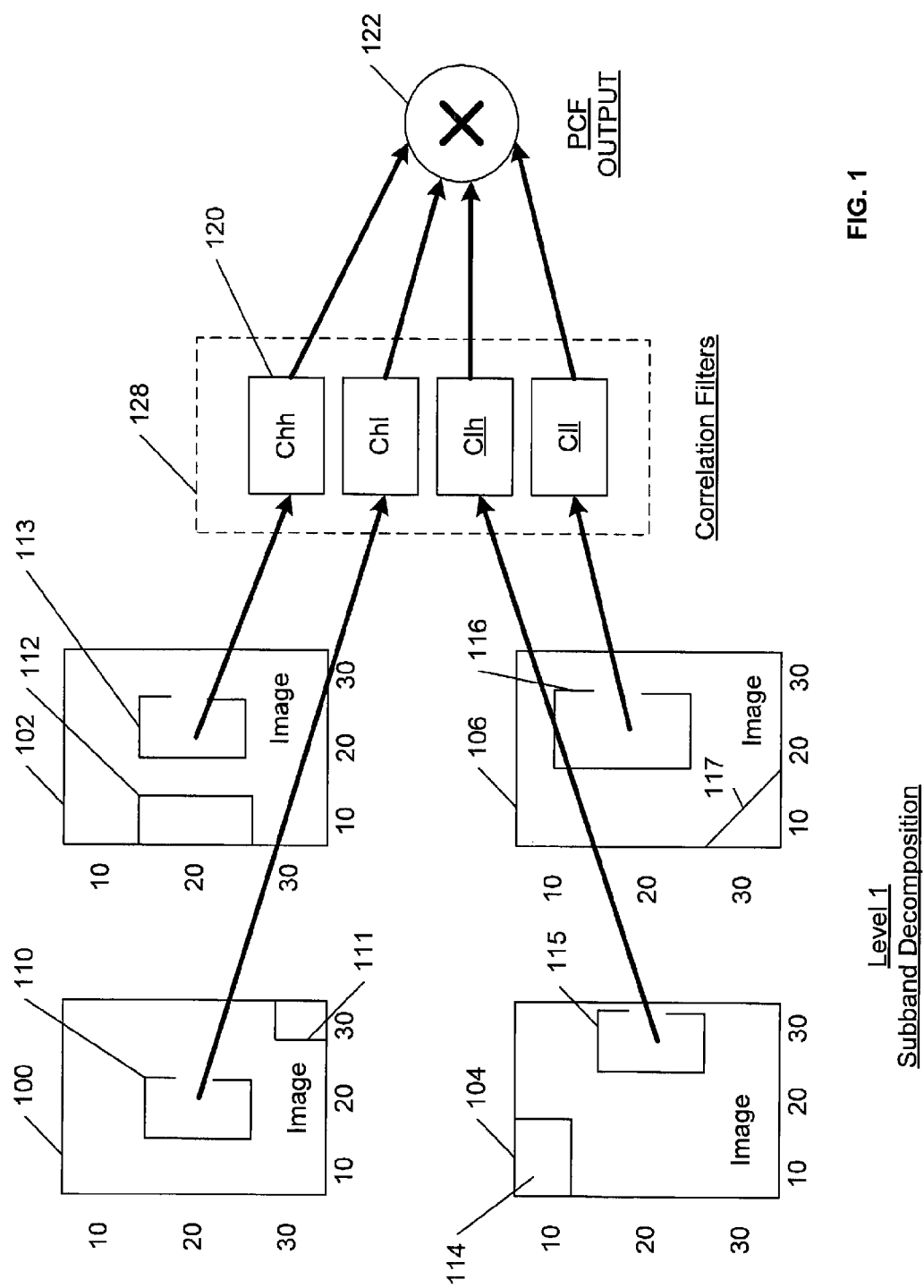
FIG. 1 illustrates a compression scheme between images being carried out.

The general structure and techniques, and more specific embodiments which can be used to effect different ways of carrying out the more general goals, are described herein.

An embodiment operates over a network such as the Internet or a cellular carrier's network to allow operations to be carried out on a server that is hosted at a remote location. The user connects to the host server via a special code that has been given to the customer by the host from the cellular provider, for example, or by logging in.

If a code is used, the code may be, for example, based on a universal short code for five digit phone numbers. Universal short codes, for example, allows certain cellular providers to connect to special sites. For example, the popular television show "American Idol" uses universal short codes on AT&T for the purpose of voting on a particular performer. Cross carrier short codes, however, may be complicated since they require the cellular phone carriers to cooperate with each other on networks to send and receive messages.

According to an embodiment, each cellular carrier provides the host with the unique short code for that particular network. A short code enables the customers and subscribers to connect to the platform. Once connected, the subscriber can download a compression decoder in the form of a wireless application protocol, or WAP. WAP supports many wireless networks such as CDPD, CDMA, GSM, PDC, PHS, TDMA, FLEX, ReFLEX, iDEN, TETRA, DECT, DataTAC and/or Mobitex; and is supported by virtually all operating systems. For example, operating systems that are specifically engineered for handheld devices such as Palm operating systems, Windows CE, FLEXOS, OS/9 and JavaOS. The WAP is loaded, and the handheld device can then receive data at a compression ratio of approximately 1:250. The data is compressed at the pixel blocks of specified sizes: for example 8×8, 16×16, 32×32, or 64×64 depending on the devices internal MPU architecture. For example, the pixels may be coded by color (red-green-blue) with luminance and phase added in. Raw data is sampled and compressed in either this or some other manner.

Pixels of the same luminance and similar color are lumped together to form a grouping that may be represented by a series of numbers. That number may equate the number of pixels that are lumped together, for example 64 pixels, 156 pixels, 1024 pixels, and 4096 pixels in terms of color, luminance and phase.

Encryption may also be used in this system, in which case a series of preliminary codes are sent as a header to the data being restored on each line of data. This header describes the compression/encryption scheme and to appropriately decode/decrypt it.

The wavelet transform decomposes the image into different resolutions (or scales). One usually refers to these as averages and details. However, there are different levels of detail resolution and one of the parameters that we can select is the number of levels we decompose the image. One usually refers to the details to describe "the finest scale", hierarchically down to the "coarsest" scale. In order to reconstruct the image it is necessary to transmit information about not only the magnitude of the wavelet transform coefficients, but also the position of the significant transform coefficient. This means that for each wavelet coefficient, we need to provide three numbers; magnitude plus the location in x and y. One of the challenges for transmitting wavelet transformed data efficiently is to use redundancy in the location description such that not each individual position has to be transmitted independently. A challenge in streaming media, is to transmit the most significant pieces of information first. By doing this, all is not lost even if the bitstream is interrupted pre-maturely. This also provides an easy way to adjust the protocol for different bit budgets. This is referred to as progressive transmission, and may also be used in this system.

In the case of a cellular phone model which has a liquid crystal display with a pixel resolution of 640×480, such as the Razr V3, 300-7000 pixels may be significantly reduced to much less. For example, in a case of extreme compression, these 300-7000 pixels can be reduced to 1228 data bits which can be downloaded in approximately ¹/₃₀ of a second. A refresh rate may be used which is 24 frames per second nominally, which of course may change to effect the flicker effects. Other transmission parameters may also be used. For example, Sprint has proposed a G4 service, using the Wimax protocol. This G4 service allows the download to take only 1/20 of a second.

In the embodiment, since a WAP application can be downloaded, a special application which is specific to the client platform can be used. For example, client X may have a special kind of screen which requires compression in a special way in order to maintain the best viewability and compression ratio for that screen. Client X may therefore receive a different WAP application than would be received by client y. In addition, the WAP application may change from moment to moment or from day to day. Different versions of the application may be sent. For example, a new service pack of the application may be sent, and the service pack may allow more efficient compression or more optimized compression. Since the reading part is downloaded, that more efficient compression may be immediately used by all the clients. In addition, the application can be dynamically changed based on the characteristics of the channel. For example, during times when the provider is overburdened, a more aggressive quantization and hence more aggressive compression scheme may be used. Each time some aspect like this changes, a new application download can be made available; and the data can be more aggressively downloaded, or downloaded in a more optimized form.

FIG. 1 illustrates how the compression is carried out. In the FIG. 1 embodiment, there are 4 images shown as 100, 102, 104, 106. These 4 images may be separate images, or may be individual frames of a low resolution video. The different areas in the images are analyzed. Each of these areas may have the same phase and luminance and color within a specified portion. The phase, luminance and color may be in different parts of the different images. Also, in many motion compensation schemes, such as MPEG, the system may assume that there are more similarities than differences between the images. However, in this system, a different tactic is adopted. This tactic finds areas within the image, such as the areas 110, 111 in FIG. 1. These areas are consistent areas that each have the same information. A correlation filter 128 first finds a color and luminance, and then correlates over the entire image to find matches to that color/luminance/phase. The matches are shown as the marked areas 110, 111, 112, 113, 114, 115, 116, 117. Each of these areas are identified from correlation by the correlation filter 128 over the entire image, using an area of specified luminance, color, and phase. Moreover, since this image will likely be displayed on a low resolution display such as the display of a cellular phone, the areas within the image need only be matched by the correlation filter to the extent of the ability to display those images. For example, the areas within the images may each be quantized to their closest value, prior to being analyzed by the correlation filters.

Correlation filter 128 may use a separate module 120 14 correlating over each of the images such as 110.

The output 122, as described above, can be an indication of the characteristics of the area, such as its color, luminance and phase, followed by an indication of the areas in the multiple images which have that area. The description of the image may describe the perimeter of the area, may describe a corner of the area, or describe the area using some vector notation, for example.

Figure 2:
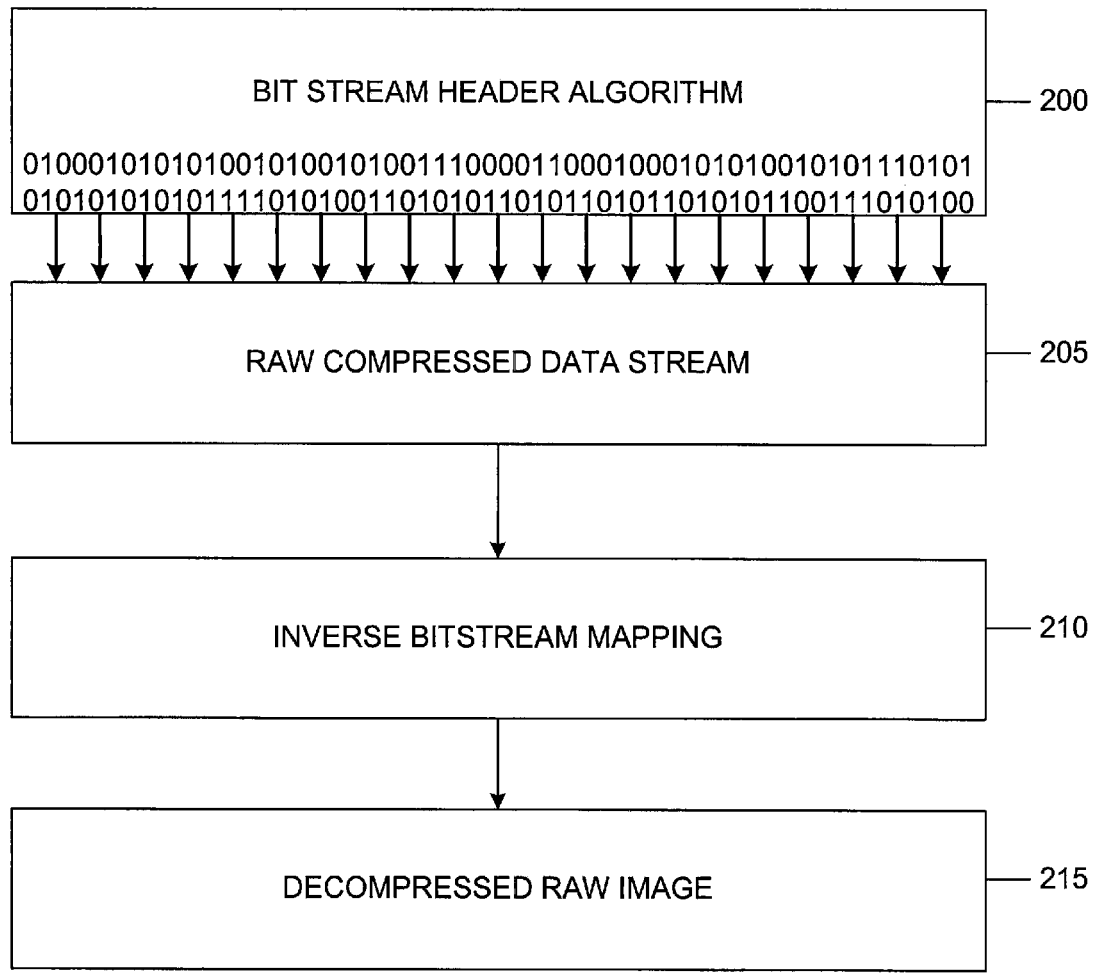
FIG. 2 illustrates an embodiment where a header is used which represents information about the format.

FIG. 2 illustrates an embodiment where a header 200 is used which represents information about the format that follows, as described above. This is followed by the compressed data stream at 205. The bitstream mapping at 210 follows, which provides bits indicative of the colors of the areas, and the descriptions of the areas themselves. The decompressed raw image can be reobtained at 215.

Figure 3:
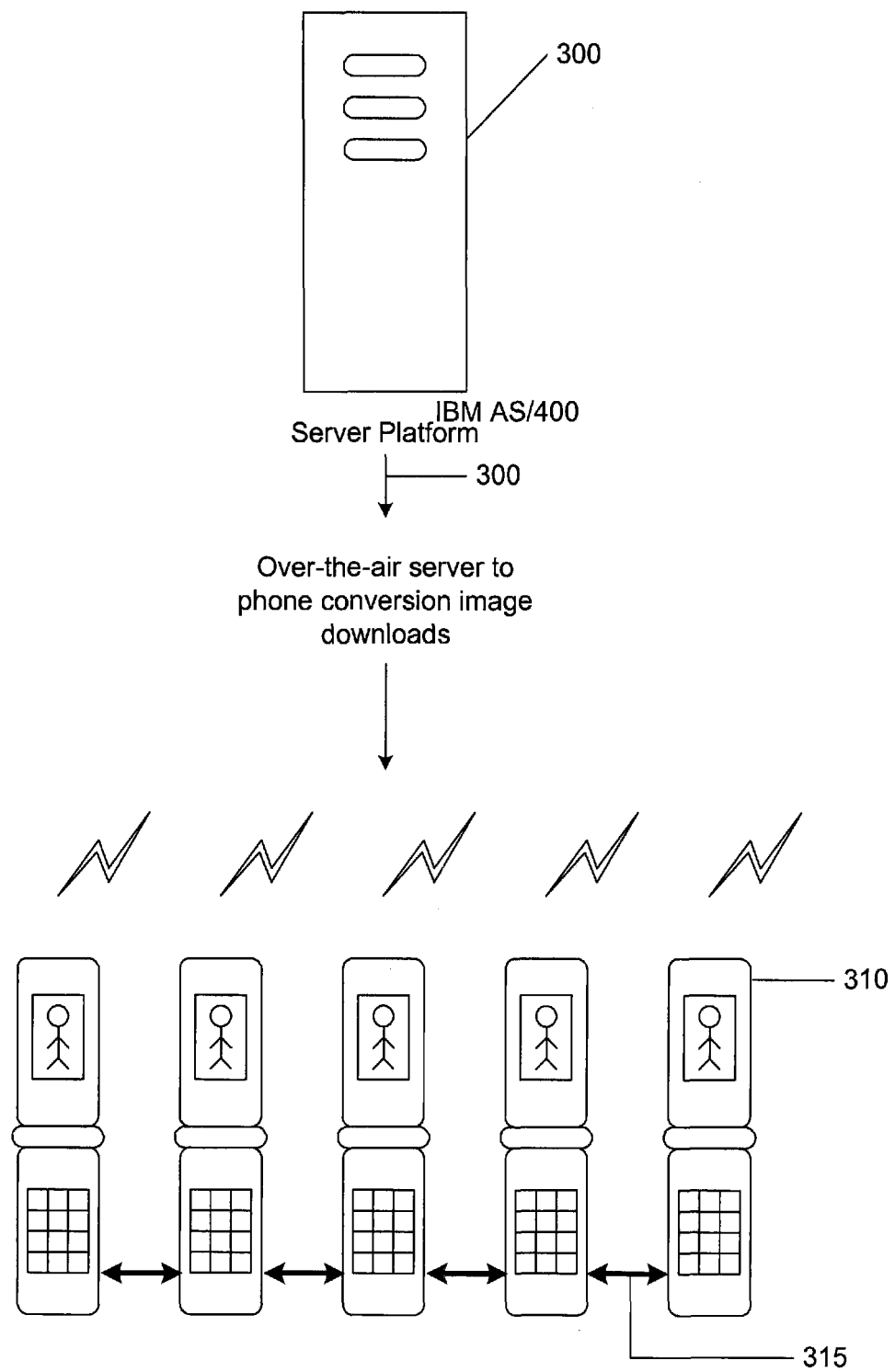
FIG. 3 shows a phone-to-phone image transfer.

In the embodiment, all of this may be done in the server, which sends the information wirelessly to a number of mobile phones shown in FIG. 3 as 310. Each of the mobile phones may individually display the video or image thus received. In order to minimize the amount of bandwidth used by the carrier, the system may also use a peer to peer process. When the number of phones in the same location all request the same image, then the carrier downloads the image to one of those phones, along with an instruction to transfer that image to another phone in the general vicinity. A short range transfer technique such as a Bluetooth 315 may be used for phone-to-phone image transfers of the information thus received.

Figure 4:
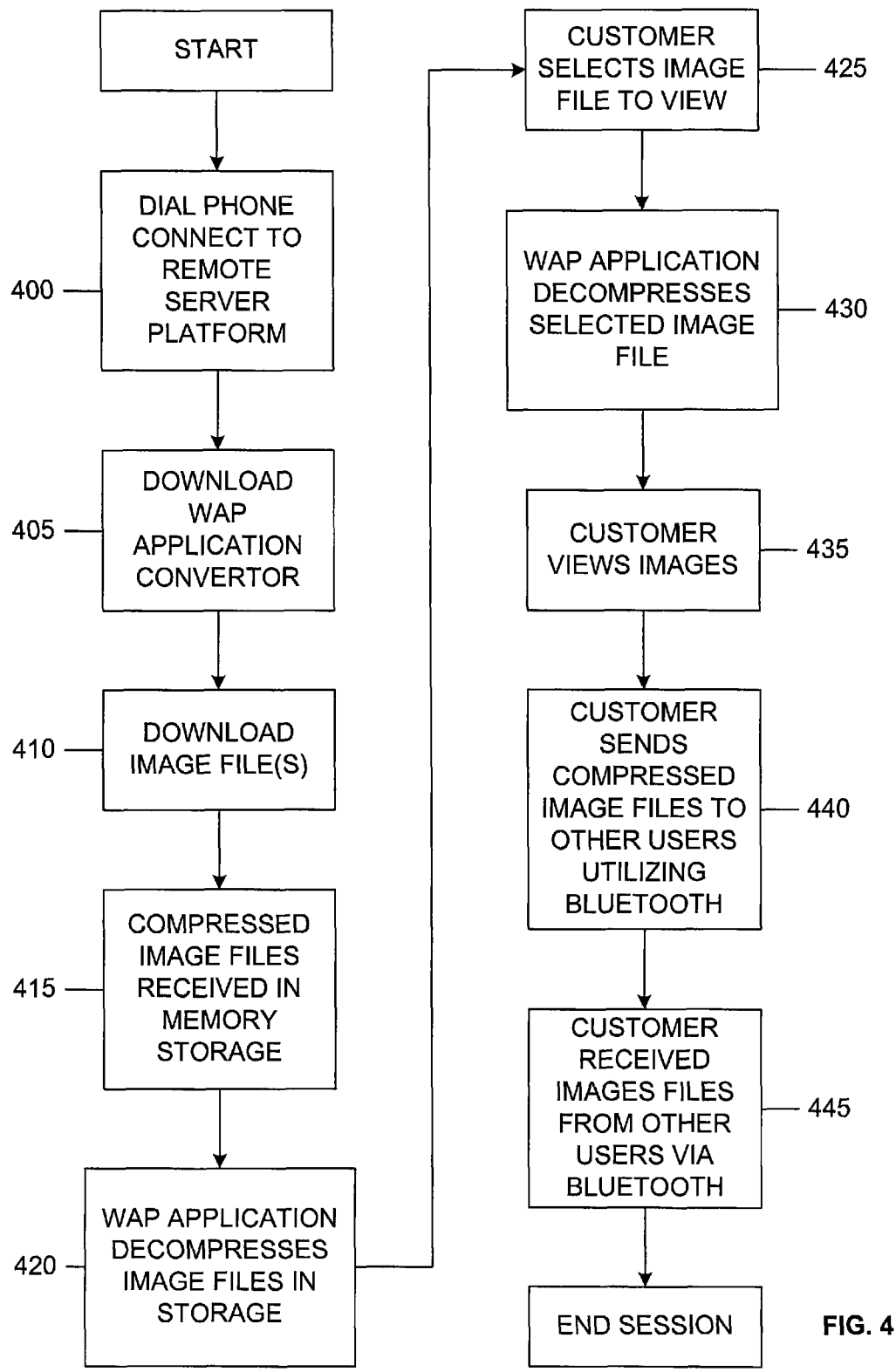
FIG. 4 illustrates the beginning to end process of sending an image.

FIG. 4 illustrates the beginning to end process. At 400, the phone connects to the remote server platform. The most recent application for the specific phone that is connected, is downloaded at 405. The compressed image file or files, or alternatively video frames, are downloaded at 410 and received into memory storage 415. Videos can be of any length, but may be preferably between one to three minutes duration. The WAP application which has been downloaded at 405 then decompresses these image files at 420. At 425, the customer selects an image file to view, and the decompressed image file 430 is selected. 435 illustrates viewing the image, and 440 represents sending these files to others using Bluetooth. 445 indicates another user receiving these files.

Figure 5:
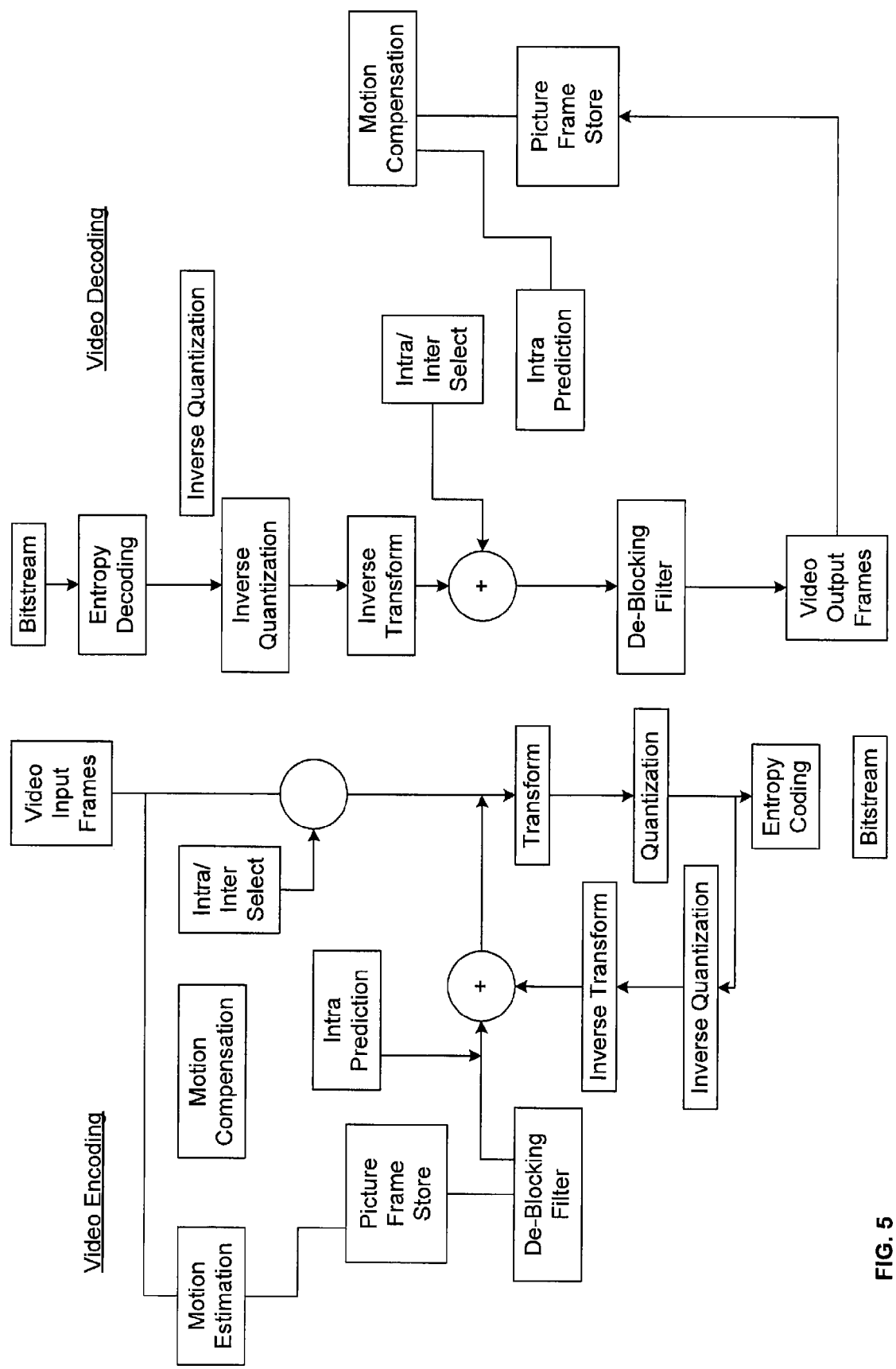
FIG. 5 illustrates the coding and decoding as carried out.

FIG. 5 illustrates how the coding and decoding is carried out. The video encoding of 500 shows how the bitstream 505 is formed by quantization, transformation, and entropy code. In a similar way, the decoding 510 uses the inverse of the encoding.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, this can be used on platforms other than cell phones, such as PDAs etc.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A method, comprising:

sending a request for an image or video to a server, from a portable phone;

also sending specific information about the portable phone to the server;

receiving a compressed version of said image or video, on the portable phone, said compressed version being specific to both the portable phone and about characteristics of the carrier and where said application is specific to different quantization values for color and luminance for the specific portable phone, and defines first quantization values for a first portable phone and second quantization values for a second different portable phone, and where said quantization values comprise values to which said color and luminance areas will be quantized, even when said values in an area to be quantized are not exactly the same;

receiving an application which can decompress the data, where said application is specific to both the portable phone and about characteristics of the carrier;

receiving from the server over a cellular connection, instructions to send said image or video to another phone among said plurality of phones that is located within the local area of said portable phone, via a different channel than the channel on which said image or video was received;

Decompressing the compressed version of said image or video using said application; and sending said image or video to said another phone that also requests said image via a Bluetooth connection.

2. A method as in claim 1, wherein said image or video is a still image.

3. A method as in claim 1, wherein said image or video is a frame of the video.

4. A method as in claim 1, wherein said image is compressed in a format such that multiple different images have similar areas identified by a common indicia indicative of one of those areas, and also by an indication of where said area is located in those multiple images.

5. A method as in claim 1, wherein said information about the carrier includes a communication load of a channel used by the carrier at a time of sending.

6. A method, comprising:

receiving a request for data to be sent to a portable phone over a carrier;

determining specific information about the portable phone, and about the carrier; and based on said specific information, compressing the data, and sending the data and also sending an application which can decompress the data, where said application is specific to both the portable phone and about characteristics of the carrier and where said application is specific to different quantization values for color and luminance for the specific portable phone, and defines first quantization values for a first portable phone and second quantization values for a second different portable phone, and where said quantization values comprise values to which said color and luminance areas will be quantized, even when said values in an area to be quantized are not exactly the same; and wherein said application is usable to decompress the information.

7. A method as in claim 6, wherein said application is optimized for characteristics of the portable phone, and further comprising a different application which is optimized for characteristics of a different portable phone.

8. A method as in claim 6, wherein said data is images.

9. A method as in claim 8, wherein said images are frames of video.

10. A method as in claim 6, wherein said requesting comprises using a universal short code number.

11. A method as in claim 6, wherein said compressing comprises finding areas among multiple images which have the same luminance and color, and transmitting information indicative of only said luminance, said color, and information about the areas.

* * * * *